United States Patent [19]
Doss, Jr. et al.

[11] Patent Number: 6,075,857
[45] Date of Patent: Jun. 13, 2000

[54] MOTOR CYCLE HELMET HEADSET

[75] Inventors: Robert L Doss, Jr., Ringgold; Christopher F Smith, Chickamauga; David G Lashley, Cartersville, all of Ga.

[73] Assignee: Ooltewah Manufacturing, Inc., Ooltewah, Tenn.

[21] Appl. No.: 08/927,192

[22] Filed: Sep. 11, 1997

[51] Int. Cl.[7] .............................. H04M 1/00; H04R 25/00
[52] U.S. Cl. ............................................. 379/430; 381/376
[58] Field of Search ...................................... 379/430, 449; 381/376, 370, 375; 455/575, 351, 568, 90

[56] References Cited

U.S. PATENT DOCUMENTS

| | | | |
|---|---|---|---|
| 4,138,598 | 2/1979 | Cech | 379/430 |
| 4,357,711 | 11/1982 | Drefko et al. | 455/575 |
| 4,833,726 | 5/1989 | Shinoda et al. | 455/575 |
| 5,109,410 | 4/1992 | Suhami et al. | 379/430 |

Primary Examiner—Jack Chiang
Attorney, Agent, or Firm—Alan Ruderman; Miller & Martin LLP

[57] ABSTRACT

A motorcycle helmet formed from an impact resistant shell for covering and protecting the head of a user has audio receiver members mounted on the interior of the shell and has a microphone at one end of a boom within the helmet. The microphone is located for use by the user at the front of the helmet while the boom has an adapter on the end opposite the microphone. The microphone has conductors communicating with a connector which communicates with the electrical energy source and control cables. The adapter is receivable within a socket formed by a channel in an extension of one of the receiver housings so that the microphone and boom may be mounted totally within the helmet. The electrical power and control cables are connected to the microphone and the receivers by means of a quick-disconnect type connector and has a separate volume control for the microphone and for the receivers so that two motorcycle riders may adjust the audio system to their liking. The modular arrangement provided by the two connectors permit elements, if broken, to be replaced readily without replacing the entire systems.

10 Claims, 3 Drawing Sheets

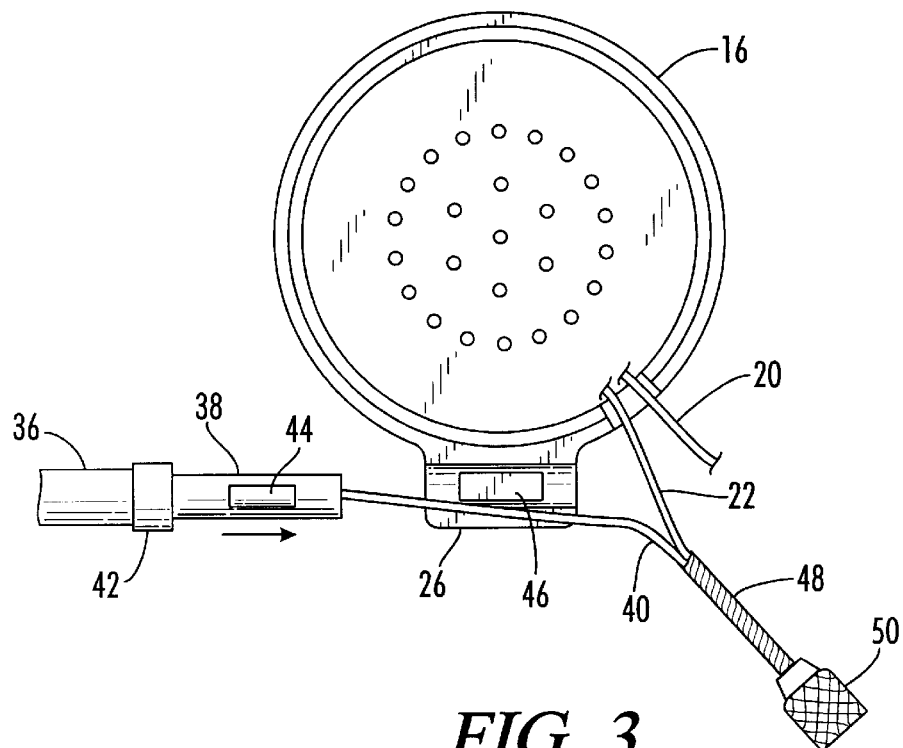
FIG. 3
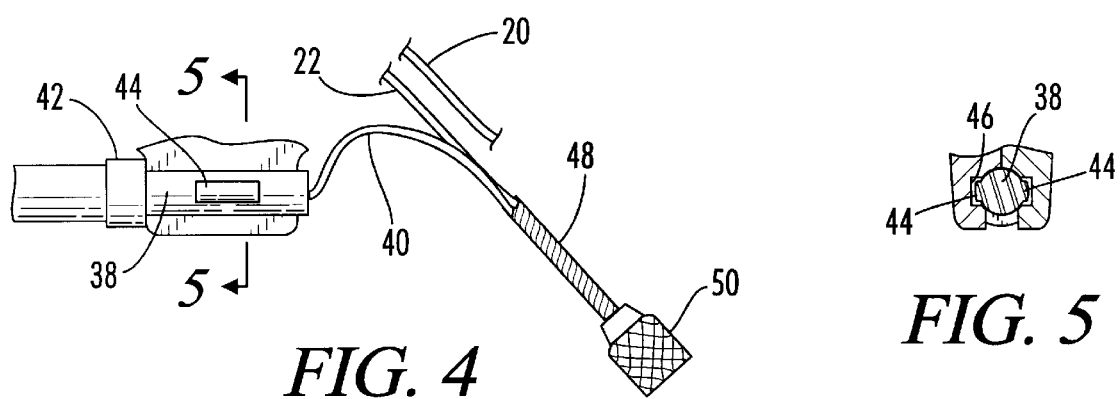
FIG. 4
FIG. 5

MOTOR CYCLE HELMET HEADSET

BACKGROUND OF THE INVENTION

This invention relates to motorcycle helmets having an internally mounted communications headset including a microphone and receivers, and more particularly to such headsets that are of modular construction.

Many motorcycles have built-in intercom communications capabilities and radios such as CB radios. In the prior art, impact resistance helmets are known having receivers mounted within the helmet, but the microphone has been secured to a boom or post mounted to the outside of the helmet, the boom acting to position the microphone adjacent the mouth of the user. Because the boom is secured outside the helmet, if a helmet is dropped, which is not uncommon due to the irregular surfaces, such as a motorcycle seat, on which the helmets are placed, the hardware holding the boom frequently is broken when it strikes the ground. Moreover, the boom structure is permanently secured as a unit to a receiver and the wiring may be permanently connected to the wiring leading from the motorcycle harness. Thus, when the boom or its supporting hardware is broken or otherwise fails, the entire headset unit must be replaced, or the helmet discarded.

In addition, the known prior art has but a single central volume control for controlling the microphone and the receivers. No other control is generally provided even when the motorcycle is used by two people. Thus, when used by two riders, the volume is generally only satisfactory to one rider. The other rider may then find the volume level too loud or too low. If the volume level is corrected for this rider, it may not be satisfactory for the other.

SUMMARY OF THE INVENTION

Consequently, it is a primary object of the present invention to provide a communications headset for an impact resistant helmet wherein the microphone and receivers are mounted within the interior of the helmet.

It is another object of the present invention to provide a motorcycle helmet communications headset having a modular construction.

It is a further object of the present invention to provide a motorcycle helmet communications headset having a microphone and receivers mounted within the interior of the helmet, the microphone and receivers having separate volume controls.

It is a still further object of the present invention to provide a motorcycle helmet communications headset having a modular construction, the headset having a microphone attached to a boom removably connected to a modular connector supported in a socket or receptacle formed in a receiver housing.

Accordingly, the present invention provides a motorcycle helmet in the form of an impact resistant casing or shell covering the head of a user including side panels overlaying the user's ears and a chin panel overlaying the mouth and chin of the user. The helmet has at least one audio receiver mounted on the interior of the side panels and a microphone disposed within the helmet adjacent the chin panel carried by a boom or post. The microphone boom, at an end opposite the microphone has an adapter which is receivable within a socket formed in the housing of one of the receivers, and through which the microphone is electrically coupled to electrical power and control cables. Thus, the microphone and its boom are of a modular construction and are disposed within the interior of the helmet. If the helmet is dropped the microphone or boom should not break since they do not extend or project outside the helmet. If, however, the microphone or boom needs to be replaced, the connectors may be readily disconnected and the microphone-boom module replaced.

Additionally, the power and control cable, which may be connected to the microphone and receivers by a quick-disconnect type connector, includes two separate volume controls, one for the microphone and one for the receivers so that two motorcycle riders may tailor the system to his or her audio preferences.

BRIEF DESCRIPTION OF THE DRAWINGS

The particular features and advantages of the invention as well as other objects will become apparent from the following description taken in connection with the accompanying drawings in which:

FIG. 3 is a side elevational view of a half of the receiver housing of FIG. 2 illustrating the manner in which the microphone boom is connected to the power and control cables;

FIG. 4 is a view of a fragment of the receiver housing illustrated in FIG. 3 depicting the manner of supporting the microphone boom; and FIG. 5 is a cross sectional view taken substantially along line 5—5 of FIG. 4.

DESCRIPTION OF THE PREFERRED EMBODIMENT

Figure 1:
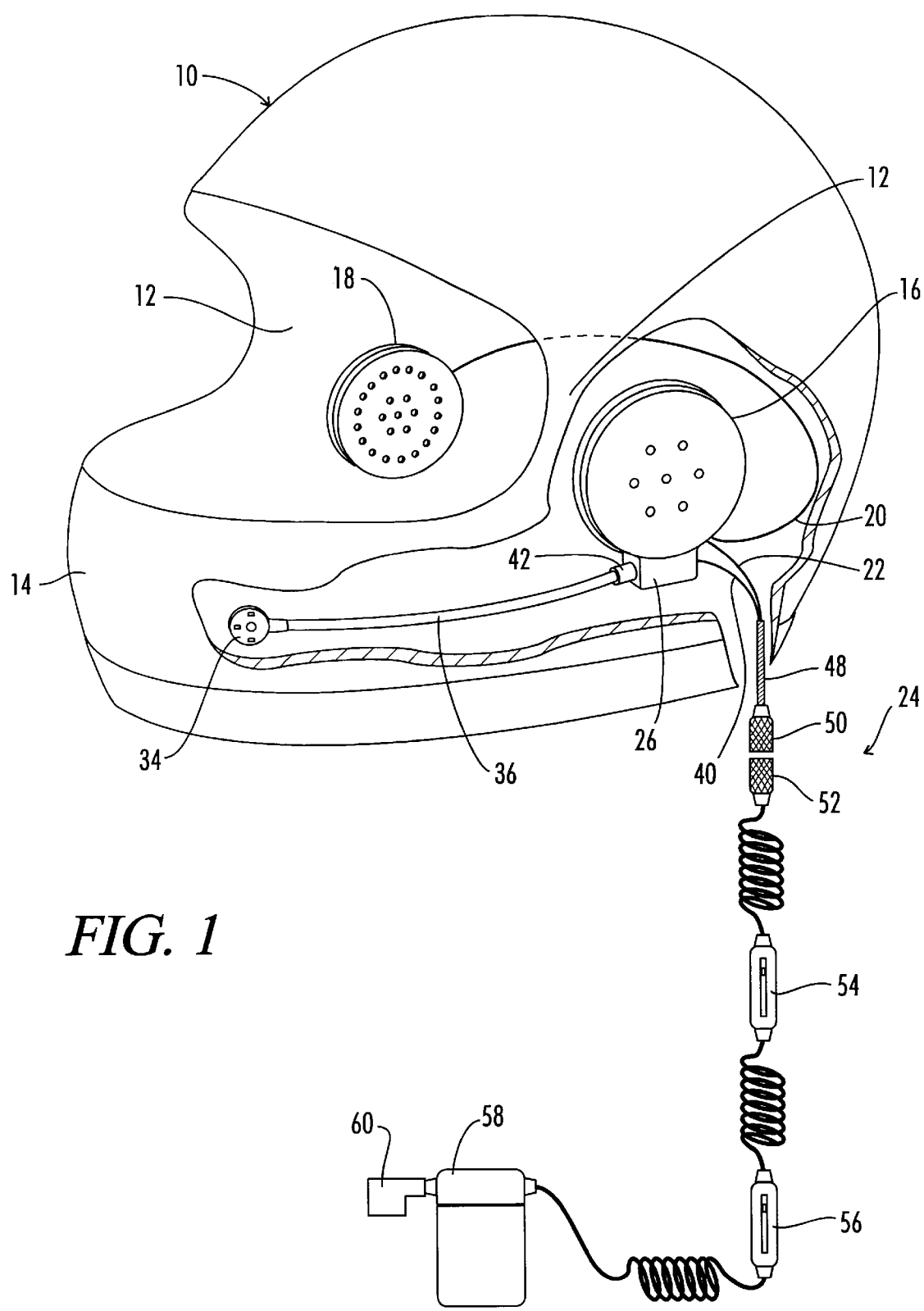
FIG. 1 is a front perspective view of a helmet partly broken away and illustrating a headset mounted therein constructed in accordance with the principles of the present invention.

Referring to the drawings, a motorcycle helmet 10 comprising a shell formed from impact resistant material such as a polycarbonate plastic is illustrated incorporating the features of the present invention. Conventionally, the helmet shell includes spaced apart side panels 12 for protecting the sides of the rider's head including the ears and a front protection portion 14 overlaying the rider's chin, mouth and jaw, or extending between the side panels 12. The helmet is open at the front above the front protection portion 14 and conventionally is covered by a pivotable transparent wind guard which is not illustrated. The side panels 12, within the interior of the helmet, support the receiver portion of the communications headset which are in the form of a pair of opposed two piece receiver housings or headset ear pieces 16, 18, the receivers being disposed so as to be adjacent respective ears of the user. Each receiver, which includes conventional speaker elements and circuitry (not illustrated) mounted within the respective housings 16, 18, communicates with electrical conductors 20, 22 conventionally connecting the circuitry of one of the receivers to the other receiver and to the audio and power supply section 24. Although not illustrated, padding material extends over the interior of the shell of the helmet and covers the receivers, the padding acting to provide a soft and comfortable cushioning adding to the protection provided by the helmet shell, and being acoustically transparent to the receivers.

Figure 2:
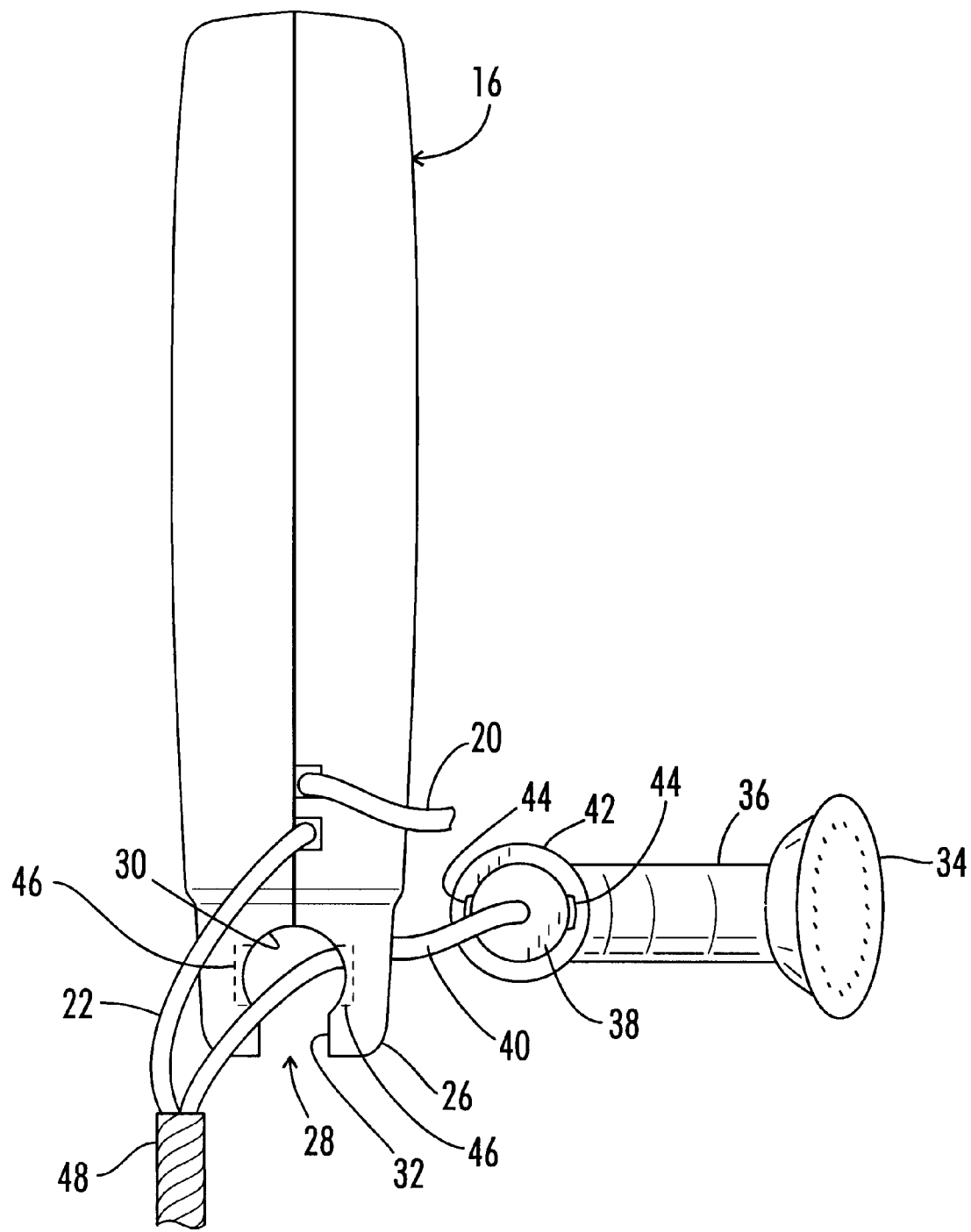
FIG. 2 is a rear elevational view of one of the receiver housings illustrating a step in the mounting of the microphone boom therein.

The casing of one of the receivers, for example receiver 16 includes an extension 26 at the lower portion thereof of each half of the receiver defining a support housing for a microphone boom. The support housing 26, as best illustrated in FIG. 2, has an elongated key-hole shaped channel or cavity 28 extending therethrough, the direction of elongation within the plane of the side panel 12 and preferably being front to rear relative to the helmet. The key-hole channel 28 has a cylindrical cavity portion 30 defining a socket opening onto an open bottom straight wall portion 32.

Inside the chin protection portion 14 of the helmet 10 is a microphone 34 mounted on one end of a boom or post 36. Preferably the microphone is an electret or condenser type noise cancelling microphone. The boom 36 is a semi-rigid plastic elongated member within which the electrical conductors from the microphone extend toward the audio and power supply section 24. At the end of the boom remote from the microphone there is an adapter 38 through and out of which these conductors 40 extend and communicate with the audio and power supply 24 as hereinafter made clear. The adapter 38 has a cylindrical configuration including an outer diameter substantially equal to the inside diameter of the cylindrical cavity portion 30 of the channel 28. Intermediate the adapter 38 and the microphone boom 36 is a stop member in the form of a cylindrical nub 42 having a diameter that is larger than the diameter of the socket or cylindrical cavity portion 30 of the channel 28 so as not to be positionable therein.

In use, the adapter 38, as illustrated in FIG. 3, is pushed into the cylindrical cavity portion 30 of the channel 28 while the conductor 40 is guided through the open bottom of the channel 28. The adapter 38 has a pair of peripherally disposed radially extending tabs 44, disposed 180 degrees apart, and the cylindrical portion 30 of the channel 28 is formed with a pair of opposed recesses 46, there being one in each half of the housing 26. The depth of the recesses 46 are substantially equal to the distance the tabs 44 extend from the periphery of the adapter so that the tabs are receivable within the recesses with a frictional fit. Thus, the adapter 38 may be securely connected within the channel 28 to support the boom 36 and microphone 34 securely. The nub 42 may be grasped to push the adapter into the cavity and to pull it out when desired. It also acts as a stop to position the couplings so that the tabs 44 are received in the recesses 46.

The conductors 22 and 40, which are directed toward the audio and power supply section 24, are shielded and covered by insulation 48 which is heat shrunk together and attached to a first member 50 of a two member "no-look" quick connect/disconnect connector. A preferred connector 50 is disclosed in U.S. Pat. No. 5,259,780. The conductors, of course, remain insulated one from the other. The second member 52 of the connector communicates with a coiled electrical cord which in turn is connected to a first potentiometer 54 that controls the audio volume of the receivers, the potentiometer 54 communicating with another coiled electrical cord which in turn is connected to a second potentiometer 56 that controls the audio volume of the transmitter, i.e., the microphone. The potentiometer 54 controls the volume for each receiver 16, 18 while the microphone sensitivity potentiometer 56 permits a rider to control his or her voice to a volume level comfortable to a second motorcycle rider on the motorcycle. This overcomes a problem in the prior art where only one central volume control has been used and, depending upon the voice level of each rider, one rider may or may not comfortably hear the other rider. The dual volume controls overcome this problem. The use of an electret (condenser) microphone has several advantages over the dynamic microphones used in the prior art, including size and input sensitivity. Not only is the electret microphone small and compact, but the output is much higher than a dynamic microphone by as much as 30 dB thereby permitting the use of the variable microphone sensitivity.

Since an electret microphone requires power, the transmitter volume control 56 is connected to a conventional 9 volt D.C. battery 58 through another coiled electrical cord as illustrated in FIG. 1. The battery 58 includes a connector 60 of the 5 pin DIN type for connecting to conventional motorcycle harnesses thereby interfacing the harness to the radio/CD/intercom.

Accordingly, the present invention by the use of the mounting arrangement between the microphone boom 36 and a receiver housing 26 within the helmet 10 permits the boom 36 and microphone 34 to be located completely within the helmet 10. Therefore if the helmet is dropped, the boom should not break as it does in conventional helmets. Moreover, the connection between the connecting members 50 and 52 provides modularity to the headset and the remainder of the audio power supply, Thus, should the boom 36 or the microphone 34 be broken for some reason, the boom may be easily disconnected from the remainder of the system and replaced, and additionally, the helmet may be readily disconnected from the remainder of the electrical system merely by disconnecting the elements 50, 52 from one another.

Numerous alterations of the structure herein disclosed will suggest themselves to those skilled in the art. For example, different shapes of adapters 38 and cavities 30 may be used other than the cylindrical shape. Also, the separate potentiometers may be combined in a single housing. Also, while two receivers are desirable to provide stereo sound, a single receiver may also be used instead. However, it is to be understood that the present disclosure relates to the preferred embodiment of the invention which is for purposes of illustration only and not to be construed as a limitation of the invention. All such modifications which do not depart from the spirit of the invention are intended to be included within the scope of the appended claims.

I claim:

1. A protective helmet including a communications headset, for motorcycle riders, said helmet including an impact resistant shell having spaced apart side panels for protecting the ears of a user and a front protection portion overlaying the chin and mouth of the user and extending rearwardly to said side panels, said headset comprising at least one audio receiver including a housing disposed in said at least one side panel, an elongated semi-rigid boom having two ends, a conductor disposed within said boom, an audio microphone secured at one end of said boom and spaced from the shell and an elongated adapter secured at the second end of said boom, a disconnectable coupling member electrically connected to said adapter for electrically communicating said microphone with a source of electrical energy located external of said helmet, said housing including an elongated channel extending therethrough in a front to rear direction relative to said helmet defining a socket, said socket having a configuration for receiving and securely mounting said adapter, thereby to mount said boom and microphone totally within said helmet.

2. A protective helmet as recited in claim 1, wherein said adapter has a cylindrical periphery, and said channel has an internal cylindrical configuration of substantially the same diameter of the periphery of said adapter.

3. A protective helmet as recited in claim 2, wherein said adapter includes at least one radial tab extending from the periphery, and said channel has a recess for receiving said at least one tab.

4. A protective helmet as recited in claim 3, wherein said adapter has two radial tabs extending from the periphery substantially 180 degrees apart, and said channel has two recesses spaced apart substantially 180 degrees for receiving said tabs to secure said adapter within said channel until manually released.

5. A protective helmet as recited in claim 1, including a first audio volume controller for controlling an electrical energy supply to said receiver, and a second audio volume controller for controlling the electrical energy supplied to said microphone.

6. A protective helmet as recited in claim 5, including electrical energy transferring means having a connecting member for connecting said coupling member to the source of electrical energy.

7. A protective helmet as recited in claim 6, including electrical conducting means for electrically communicating said receiver with said coupling member.

8. A protective helmet as recited in claim 1, wherein said microphone is an electret microphone.

9. A motorcycle helmet, comprising:

a shell having opposed side panels, each side panel having an inner surface;

a front protection portion integrated between the side panels for disposition in front of a user's mouth, the front protection portion having an inner surface;

an audio receiver disposed inside the helmet at an inner surface of one of the side panels; and a semi-rigid microphone boom disposed adjacent the inner surface of the front protection portion, the semi-rigid microphone boom having a conductor therein and a microphone coupled to a first end of the boom, and a second end removably coupled to the audio receiver.

10. The helmet of claim 9, wherein:

the audio receiver includes a housing having a socket; and the second end of the microphone boom includes an adapter releasably coupled to the socket.

* * * * *